(12) United States Patent
Kleb et al.

(10) Patent No.: US 6,382,483 B1
(45) Date of Patent: May 7, 2002

(54) ROOF LOAD CARRIER SYSTEM

(75) Inventors: Emmerich Kleb, Markgroeningen; Hans Riehle, Ludwigsburg, both of (DE)

(73) Assignee: ORIS Fahrzeugteile Hans Riehle GmbH, Moeglingen (DE)

( * ) Notice: Subject to any disclaimer, the term of this patent is extended or adjusted under 35 U.S.C. 154(b) by 0 days.

(21) Appl. No.: 09/455,017

(22) Filed: Dec. 9, 1999

(30) Foreign Application Priority Data

Dec. 11, 1998 (DE) ......................................... 198 57 322

(51) Int. Cl.⁷ ................................................ B60R 9/00
(52) U.S. Cl. ...................................................... 224/321
(58) Field of Search ............................... 224/321, 330, 224/331, 359

(56) References Cited

U.S. PATENT DOCUMENTS

| | | | |
|---|---|---|---|
| 3,545,660 A | | 12/1970 | Stephen |
| 5,190,198 A | | 3/1993 | Cucheran |
| 5,226,570 A | | 7/1993 | Pedrini |
| 5,385,285 A | | 1/1995 | Cucheran et al. |
| 5,715,980 A | * | 2/1998 | Blankenburg et al. ...... 224/321 |
| 5,758,810 A | * | 6/1998 | Stapleton ..................... 224/321 |
| 5,791,536 A | | 8/1998 | Stapleton |
| 5,924,614 A | * | 7/1999 | Kuntz et al. ................. 224/321 |
| 6,119,908 A | * | 9/2000 | Reichenberger et al. .... 224/321 |

FOREIGN PATENT DOCUMENTS

| | | | |
|---|---|---|---|
| FR | 2 705 295 | 11/1994 | |
| GB | 2179901 A | * 9/1985 | ................. 224/321 |
| WO | WO 94/10007 | 5/1994 | |
| WO | WO 98/39177 | 9/1998 | |

* cited by examiner

Primary Examiner—Stephen K. Cronin
Assistant Examiner—Maerena W. Brevard
(74) Attorney, Agent, or Firm—Barry R. Lipsitz; Douglas M. McAllister

(57) ABSTRACT

In order to improve a roof load carrier system for motor vehicles, comprising a roof rack with a cross member receiving loads and with holders which are arranged on both sides of the cross member and have holder feet with fixing devices arranged on them, wherein the holder feet can be inserted into receiving means arranged on the vehicle and can be fixed in these with the fixing devices, in such a manner that this is easy to mount and dismount it is suggested that a hand-operated element be arranged on one side of the roof rack, that a coupling device be provided which couples the hand-operated element with the fixing devices such that the fixing devices on both holder feet can be actuated via the hand-operated element.

42 Claims, 12 Drawing Sheets

ROOF LOAD CARRIER SYSTEM

The present disclosure relates to the subject matter disclosed in German Application No. 198 57 322.7 of Dec. 11, 1998, the entire specification of which is incorporated herein by reference.

The invention relates to a roof load carrier system for motor vehicles, comprising a roof rack with a cross member receiving loads and holders which are arranged on both sides of the cross member and have holder feet with fixing devices arranged on them, wherein the holder feet can be inserted into receiving means arranged on the vehicle and can be fixed in them with the fixing devices.

Roof load carrier systems of this type are known from the state of the art. The problem with them is that the assembly of the roof rack is very complicated and awkward since the individual fixing devices have to be actuated at the respective, individual holder feet, wherein the fixing devices mostly have screws which have to be turned with a corresponding tool.

The object underlying the invention is therefore to improve a roof load carrier system for motor vehicles such that this can be mounted and dismounted in a simple manner.

This object is accomplished in accordance with the invention, in a roof load carrier system of the type described at the outset, in that a hand-operated element is arranged on one side of the roof rack and that a coupling device is provided which couples the hand-operated element to the fixing devices such that the fixing devices on both holder feet can be actuated via the hand-operated element.

The advantage of the inventive solution is thus to be seen in the fact that it is possible to place the roof rack in position from one side of the motor vehicle and that when the holder feet are seated in the receiving means the fixing devices can be actuated due to actuation of the hand-operated element such that both holder feet are fixed in position at the same time in the corresponding receiving means.

One particular advantage of this solution is to be seen in the fact that with it any uneven or one-sided fixing of the roof rack by mistake can be avoided since the roof rack is either fixed completely and securely with both holders or with neither of the holders so that one-sided fixings of the roof rack leading to accidents can be avoided.

The inventive solution requires a hand-operated element only on one side of the roof rack. It is, however, also conceivable to provide a hand-operated element on both sides insofar as each hand-operated element is coupled to all the fixing devices.

In principle, it would also be conceivable with the inventive solution to design the fixing devices such that they are likewise provided with threads which required a great number of turns, as known from the state of the art.

Since operation of such fixing devices would, however, make an undesirably long time necessary for the fixing even via operation by the hand-operated element, it is preferably provided for each fixing device to have a fixing element which can be brought into engagement with an abutment provided on the receiving means as a result of movement along a path extending to the abutment. Due to the movement of the fixing element along a path extending to the abutment a possibility is created of bringing about a rapid fixing of the holder feet by means of a limited movement of the hand-operated element.

The fixing element could thereby be movable along an inclined face extending like a wedge. One particularly advantageous solution provides for the fixing element to be movable along a curved path since the respective holder foot may thereby be secured in the receiving means in a simple manner.

The simplest possibility of moving the fixing element along a curved path is for the fixing element to be pivotable about an axis.

The fixing element can, in principle, be of any optional design. One advantageous solution provides for the fixing element to have a nose which can be moved such that the nose is movable between a release position not engaging the abutment and a fixing position engaging the abutment.

A particularly preferred solution provides for the fixing device to be designed as a swivel claw.

With respect to the design of the receiving means, no further details have so far been given. The receiving means could, in principle, be a local receiving means which is provided at a specific location on the vehicle and into which the roof rack can be securely inserted. A particularly favorable solution does, however, provide for the receiving means to be designed as receiving rails C-shaped in cross section, extending in longitudinal direction of the vehicle and having a contact arm, a side arm and an upper transverse arm; the holder foot can be placed on the contact arm and the upper transverse arm forms the abutment. Such a form of realizing the receiving means may be integrated in a particularly aesthetic and advantageous manner into a vehicle roof.

In addition, such a design of the receiving means creates the possibility of placing the roof rack at various locations of the receiving means.

An even more advantageous solution provides for the receiving means to be designed as receiving rails with a double C-shape in cross section and having the contact arm, two side arms and two upper transverse arms and to form a T-shaped groove, into which the respective holder foot can be inserted. Such a shape of the receiving means is preferably a receiving means customary in many cases on a motor vehicle.

Such a receiving rail provided with a T-shaped groove is customarily designed such that for the insertion of the holder feet the receiving rail is provided with a special cutout, in the region of which the transverse arms are either partially or completely cut out in order to facilitate insertion into the T-shaped groove of a member acting as a groove block.

A particularly favorable variation of the inventive solution does, however, provide for such a cutout not to be necessary but for the holder feet, with fixing elements in release position, to be insertable into the T-shaped groove by way of an opening therein extending between the transverse arms over the length thereof and for the fixing elements to be brought into the fixing position when the holder feet are inserted into the T-shaped groove. As a result, a complicated machining of the receiving rail is not necessary with such a solution but this can be a quite simple, extruded section provided with a constant cross section and without any cutout. This solution has, in addition, the great advantage that all the problems with respect to soiling or also the risks of injury in the region of the cutout can be avoided.

With respect to the design of the coupling device, no further details have so far been given. The coupling device is preferably designed as a mechanical coupling device and could, for example, have cable lines which form a mechanical connection between the fixing devices and the hand-operated element. The provision of such cable lines does, however, have disadvantages with respect to convenience of operation and an easy-action operability of the fixing devices.

For this reason, it is preferably provided for the coupling device to be designed as a coupling rod assembly actuating the fixing devices not only in the direction of the release position but also in the direction of the fixing position so that as a result of effective action on the fixing devices via the hand-operated element not only their release position but also their fixing position can be brought about.

In order to abut the fixing element securely on the abutment in the fixing position and thereby compensate for tolerances and play, the coupling device is preferably designed such that it keeps the fixing elements acted upon in the fixing position in a resiliently elastic manner.

This may be realized by means of resiliently elastic elements integrated into the coupling device or, however, also by way of elastic deformation of the connection parts, such as rod parts, lever parts or shaft of the coupling device itself.

A particularly advantageous design of the coupling rod assembly provides for this to have a coupling shaft extending along the cross member and drive elements for the fixing devices arranged on both sides thereof. A coupling of the fixing devices provided on the holders arranged on both sides of the cross member may be brought about, in particular, via the shaft extending along the cross member.

The drive elements may be designed, for their part, in the most varied of ways. In order to convert the rotary movement of the coupling shaft for the actuation of the fixing devices, it is preferably provided for the drive elements to act on the fixing devices via connecting rod assemblies.

In order to convert the rotary movement of the coupling shaft into a movement of the connecting rod assemblies in a simple manner it is preferably provided for the drive elements to comprise gear elements for the actuation of the connecting rod assemblies.

Gear elements of this type may be designed in the most varied of ways. It would, for example, be conceivable to design the gear elements as lever gears which convert the rotary movement of the coupling shaft over to the connecting rod assembly.

Another, particularly advantageous possibility provides for the gear elements to be designed as connecting link gears which convert the rotary movement of the coupling shaft into an essentially linear movement of the connecting rod assemblies via a connecting link.

Alternatively thereto, it would, however, also be conceivable to design the gear elements as eccentric gears.

With respect to the interaction of the hand-operated element and the coupling device, no further details have so far been given. In principle, the hand-operated element can be arranged at any point of the coupling rod assembly in order to actuate it. One particularly advantageous solution provides for the hand-operated element to be arranged on one side of the coupling shaft.

The hand-operated element may, in principle, be designed as a rotary knob so that turning of the coupling shaft is possible via a turning action on this knob. A particularly favorable solution provides for the hand-operated element to be designed as a lever since such a lever creates the possibility of transferring an adequately large operating force to the coupling device in a simple manner.

In order to ensure at the same time that the fixing devices remain in the fixing position and thus the: roof rack is securely fixed in the receiving means, it is preferably provided for the hand-operated element to be securable in the fixing position of the fixing devices in relation to the holder arranged close to it so that a securing the fixing position of the individual fixing devices also takes place at the same time via the hand-operated element.

The hand-operated element is preferably secured in position in relation to the holder via a catch means, in particular, a lock, with which the hand-operated element can be fixed in relation to the holder so that the roof rack is secured at the same time in the fixed position relative to the vehicle by the catch means or the lock and cannot be removed from the vehicle. In the case where a lock is used, security is provided not only for the use of the roof rack but also against theft.

In order, on the one hand, to be able to fix the hand-operated element on the holder in a simple manner but, on the other hand, to also facilitate a collision-free actuation relative to the holder, it is preferably provided for the hand-operated element to be movable between a non-operable position, in which it can be fixed on the holder, and an operable position, in which it cannot be fixed on the holder.

In this respect, it is possible to remove the hand-operated element further from the holder for operating the same, i.e. in its operable position, in order to avoid collisions of the hand with the holder.

The movement of the hand-operated element from the non-operable position into the operable position may be realized in a particularly simple manner when the hand-operated element is movable in the direction of its axis of rotation, i.e. that a linear movement of the hand-operated element in the direction of its axis of rotation is sufficient to transfer this from the non-operable position into the operable position or vice versa.

With respect to the possibility of positioning the holder feet in the receiving means, no further details have so far been given in conjunction with the discussion of individual embodiments. One advantageous embodiment, for example, provides for the receiving means to extend in the direction of travel of the motor vehicle and for the holder feet to be displaceable in the receiving means in the direction of travel in order to facilitate a variable positioning of the roof rack relative to the vehicle.

The displaceability of the holder feet may be configured particularly advantageously when the holder feet are supported in the receiving means with rollers so that a very easy-motion displacement of the holder feet is possible in the direction of travel as a result of these rollers.

In order, in addition, to prevent any canting of the holder feet in the receiving means, it is preferably provided for the holder feet to be guided in the receiving means with transverse guide rollers so that it is possible for a user standing on one side of the vehicle to position the roof rack relative to the vehicle at the desired location without having to constantly go around to the other side and carry out a suitable positioning of the holder on the other side.

With these measures, a complete, one-sided operability of the roof rack is advantageously ensured since the roof rack can be inserted into the receiving means by a user standing on one side of the vehicle and be displaced in these receiving means in the direction of travel for such a time until the suitable position is reached, and it is also possible to transfer the fixing devices into the fixing position via the hand-operated element from this side.

In order, on the other hand, to achieve a secure fixing of the holder foot in the respective receiving means in addition to the easy displaceability, it is preferably provided for the respective holder foot to be fixed in a positive-locking manner in the respective receiving means against any displacement in longitudinal direction of the receiving means, i.e. that, on the one hand, an easy movement of the holder foot is intended to be possible when the fixing device is in the release position but, on the other hand, a positive-locking fixing is intended to be realizable when the holder foot is in the desired position.

Such a positive-locking securing of the holder foot could, for example, be brought about in that the fixing element effects a positive-locking securing of the holder foot relative to the receiving means in longitudinal direction.

It is, however, even more advantageous when the holder foot and the receiving means have positive-locking elements which can be brought into engagement as a result of transfer of the fixing device into the fixing position; this means, however, that these positive-locking elements are provided on the holder foot itself and not on the fixing device and thus bring about a positive-locking connection directly between the holder foot and the receiving means without the forces to be absorbed from the positive-locking elements acting via the fixing device.

In the case of such positive-locking elements acting directly between the holder foot and the receiving means it is, however, intended to avoid these coming into engagement during displacement of the roof rack relative to the receiving means to the correct positioning of the roof rack in relation to the vehicle. For this reason, it is preferably provided for the positive-locking elements to be acted upon in a spring-like manner in the direction of their non-engaged position and for them not to engage until they are acted upon contrary to the spring action.

A particularly advantageous solution therefore provides for the fixing device to counteract the spring-like; action on the positive-locking elements during the transfer of the fixing device from the release position into the fixing position.

A particularly favorable solution from a constructional point of view therefore provides for the positive-locking element arranged on the holder foot to be rigidly connected to it and for the holder foot to be acted upon in relation to the receiving means by an element which is acted upon in a spring-like manner, abuts on the receiving means and is displaceable therein such that without a fixing device counteracting the spring action the positive-locking element arranged on the holder foot and the positive-locking element arranged on the receiving means are not engaged.

The positive-locking elements could be brought into engagement by means of a movement of the holder foot in the most varied of directions. A particularly favorable solution provides for the positive-locking elements to be brought into engagement as a result of the holder foot being acted upon in support direction towards a contact surface of the receiving means. This means that the fixing device preferably acts on the holder foot such that it moves this in the support direction onto the contact surface of the receiving means.

So that the respective holder foot, when the positive-locking elements engage in one another, is in a position, in which the positive-locking elements face one another and can thus be brought exactly into engagement with one another it is provided for the respective holder foot to be preliminarily positioned in the receiving means prior to engagement of the positive-locking elements in one another.

Such a preliminary positioning of the holder foot may be realized in the most varied of ways. For example, it would be possible to provide optical marks on the holder foot and/or the receiving means as preliminary positioning of the holder foot.

One advantageous possibility provides, however, for the elements to be preliminarily positioned in the receiving means at defined locations as a result of a slight locking.

Such a slight locking may, for example, be brought about by a weak detent spring which is only strong enough to cause a slight hindrance against any further displacement of the holder foot relative to the receiving means so that the user recognizes that the defined position has been reached due to this slight resistance to the continued displacement. The slight locking is not, however, intended to be so strong that the user has problems in moving the holder foot beyond the respective, defined position.

This may be realized particularly simply when the receiving means is provided with recesses, in which the elements engage for the preliminary positioning of the respective holder foot relative to the receiving means.

In the simplest case, the elements are designed as rollers of the holder feet which therefore, on the one hand, ensure an easy displacement of the holder foot in the receiving means but, on the other hand, convey to the user a slight resistance to any continued displacement of the holder foot when they run into the recesses.

With respect to the design of the cross member, no further details have been given in conjunction with the embodiments described thus far. One advantageous embodiment, for example, provides for the cross member to be provided with a transverse guide groove which is designed, for example, as a C-shaped groove so that groove blocks can be introduced into it in order to fix roof loads directly on the cross member or to fix additional roof load carriers, such as, for example, bicycle holders or containers or roof boxes or the like, on the cross member.

In this respect, the transverse guide groove is preferably designed such that it has at the ends of the cross member outer insertion openings for groove blocks which can be block-like members or rails or the like. As a result, the groove blocks are reliably secured against release from the transverse guide groove due to upward lifting.

In order, on the other hand, to again secure the groove blocks against any lateral removal from the transverse guide groove, it is provided for the outer insertion openings of the transverse guide groove to be closable by means of closure elements which can be positioned in front of the insertion openings and moved away from the insertion openings.

In order to ensure that the closure elements are in their position closing the insertion opening when the hand-operated element is also in the fixing position of the fixing device and secured on the holder, for example, is secured by means of a lock, it is preferably provided for the closure elements to be secured in their position closing the outer insertion openings when the hand-operated element is in the fixing position of the fixing devices and is secured on the holder. This means that an interaction between the closure elements and the hand-operated element can be brought about in that the closure elements are secured in the secured position of the hand-operated element.

This may be realized in a particularly favorable manner when the closure elements can be secured by means of the coupling device, i.e. that the coupling device not only contributes to providing the connection between the hand-operated element and the fixing devices but also serves, at the same time, to secure the closure elements in their position closing the insertion openings.

To secure the closure elements in the position closing the insertion openings, it is preferably provided for the closure element arranged on the side of the hand-operated element to be securely connected to the hand-operated element and in the non-operable position of the hand-operated element to be in its position closing the corresponding insertion opening and in the operable position of the hand-operated element to be in its position releasing the insertion opening.

To secure the closure element on a side of the cross member located opposite the hand-operated element, it is preferably provided for this closure element to be held on the holder so as to be pivotable by means of a swivel bracket and to be pivotable from a position closing the corresponding, outer insertion opening into a position releasing the insertion opening.

In this respect, the closure element is preferably pivotable in a plane extending transversely to the longitudinal direction of the cross member.

To secure this closure element in its position closing the corresponding insertion opening, it is preferably provided for the swivel bracket to be secured due to the movement of the hand-operated element from the operable position into the non-operable position.

This is preferably possible due to displacement of the coupling shaft which extends along the cross member and has at its end an adjusting element, with which the swivel bracket can be secured in the position, in which the closure element closes the outer insertion opening.

Additional features and advantages of the invention are the subject matter of the following description as well as the drawings illustrating several embodiments.

Figure 1:
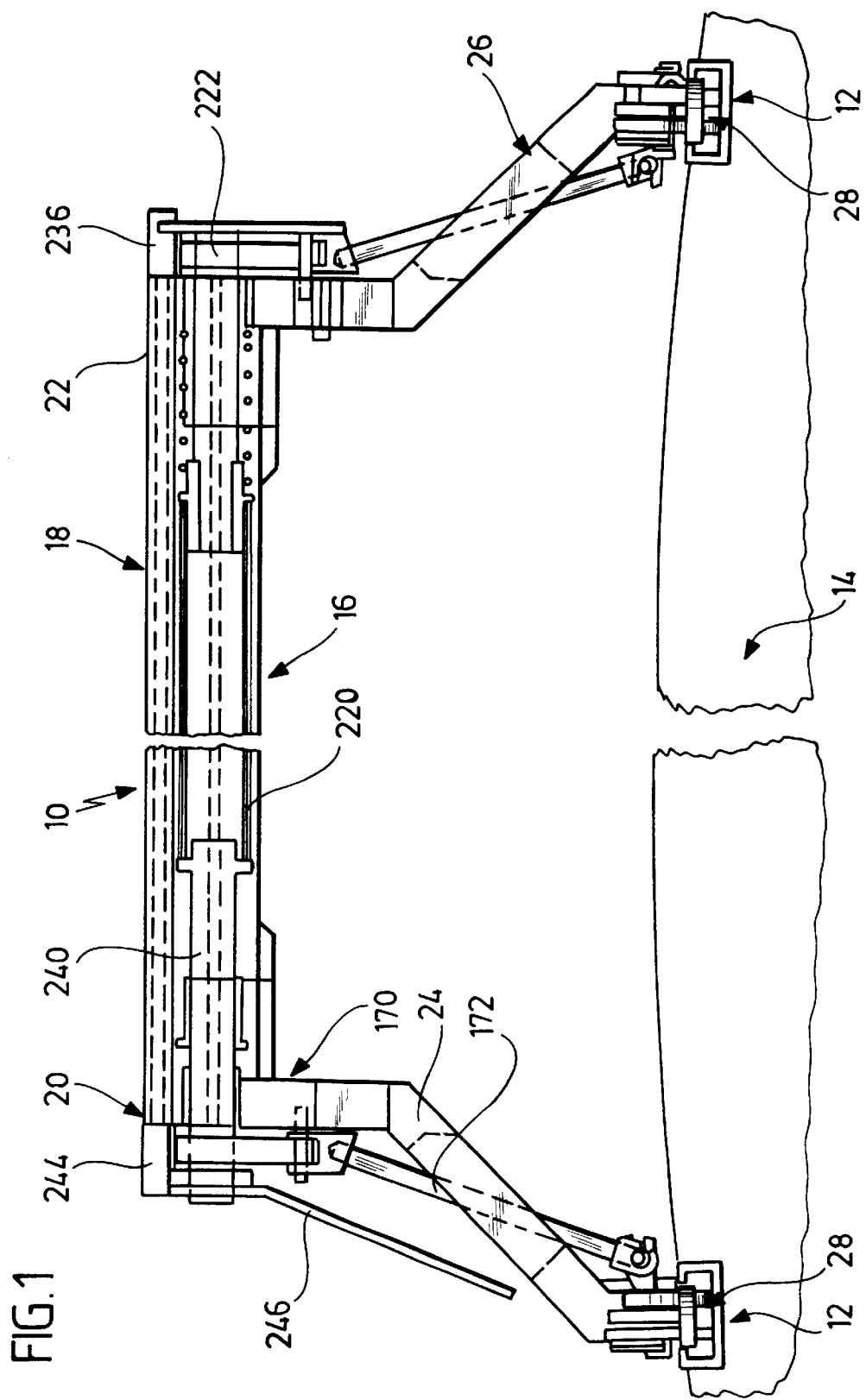
FIG. 1 shows a view of an inventive roof carrier system with a cross member in a cutaway illustration contrary to the direction of travel.

One embodiment of a roof carrier system designated as a whole as 10 comprises a roof rack 16 which can be inserted into receiving means 12 which are securely arranged on the roof 14 of a motor vehicle.

The roof rack 16 has a cross member 18, which extends approximately parallel to the roof 14 and transversely to the direction of travel, is provided at its respective ends 20 and 22 with holders 24 and 26 and can be fixed with these in the receiving means 12, wherein for this purpose each of the holders 24, 26 engages in the respective receiving means 12 provided for it with a holder foot 28 and can be fixed in position therein.

Figure 2:
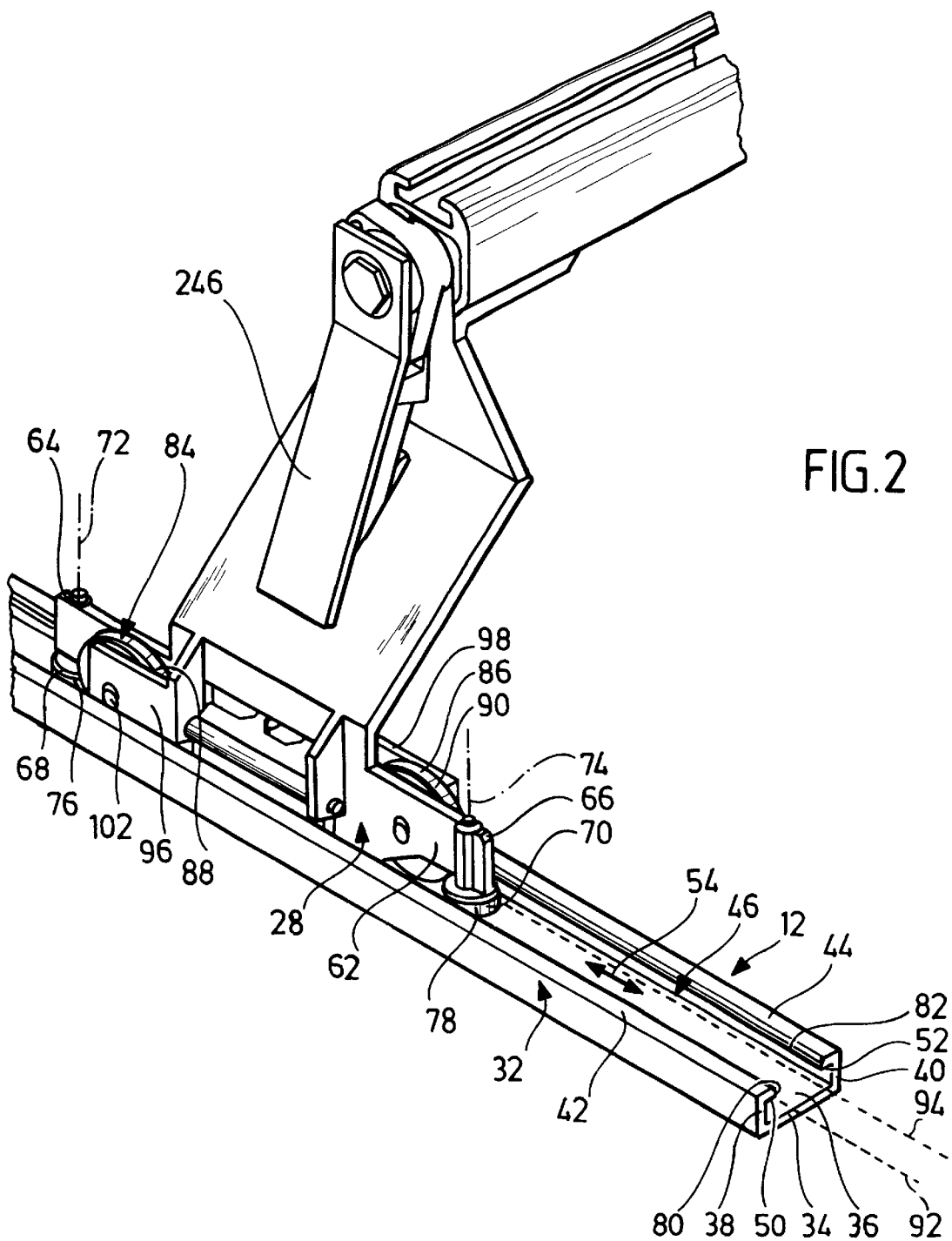
FIG. 2 shows a perspective illustration of the inventive roof carrier system in the region of the holder with hand-operated element in FIG. 1 from the outside.
Figure 3:
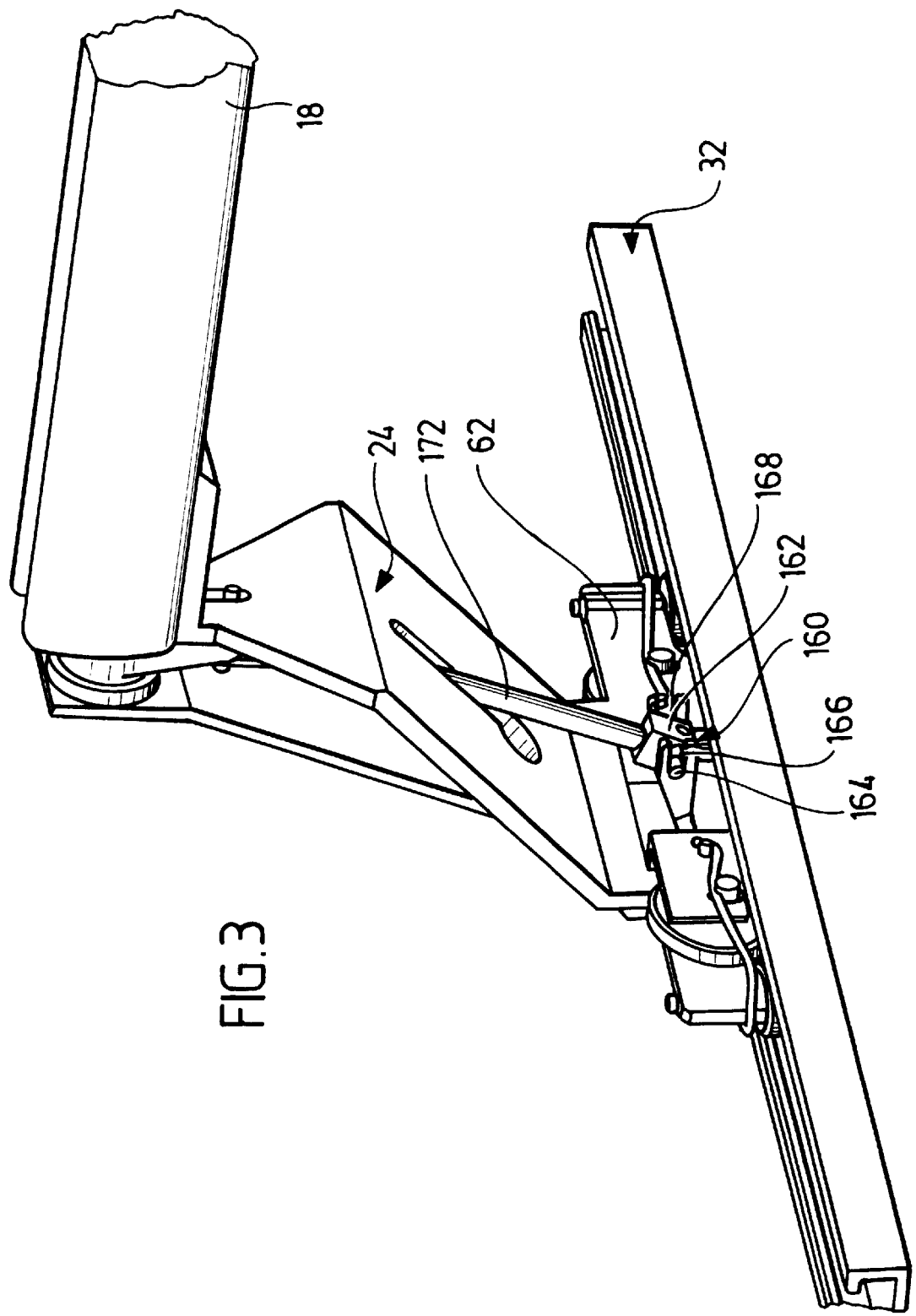
FIG. 3 shows a perspective illustration in the region of the holder with hand-operated element in FIG. 1 from the inside.

As illustrated again in FIGS. 2 and 3 on an enlarged scale, each of the receiving means 12 is formed by a receiving rail 32 which, for its part, has a contact arm 34 which bears a contact surface 36. Side arms 38 and 40 of the receiving rail 32 rise above the contact surface 36 on both sides of the contact arm 34 and these side arms each bear upper transverse arms 42 and 44, respectively, which extend, proceeding from the side arms 38, 40, towards one another and approximately parallel to the contact arm 34 and delimit an opening 46 of the receiving rail 32, through which an inner space 48 of the-receiving rail 32 located between the contact surface 36 and the transverse arms 42 and 44 is accessible, wherein the upper transverse arms 42 and 44, in particular, are arranged so as to face the inner space 48 with their undersides 50 and 52 proceeding from the side arms 38 and 40 and facing the contact surface 36.

The receiving rail 32 preferably extends with its longitudinal direction 54 approximately parallel to the :direction of travel of the respective motor vehicle.

Figure 4:
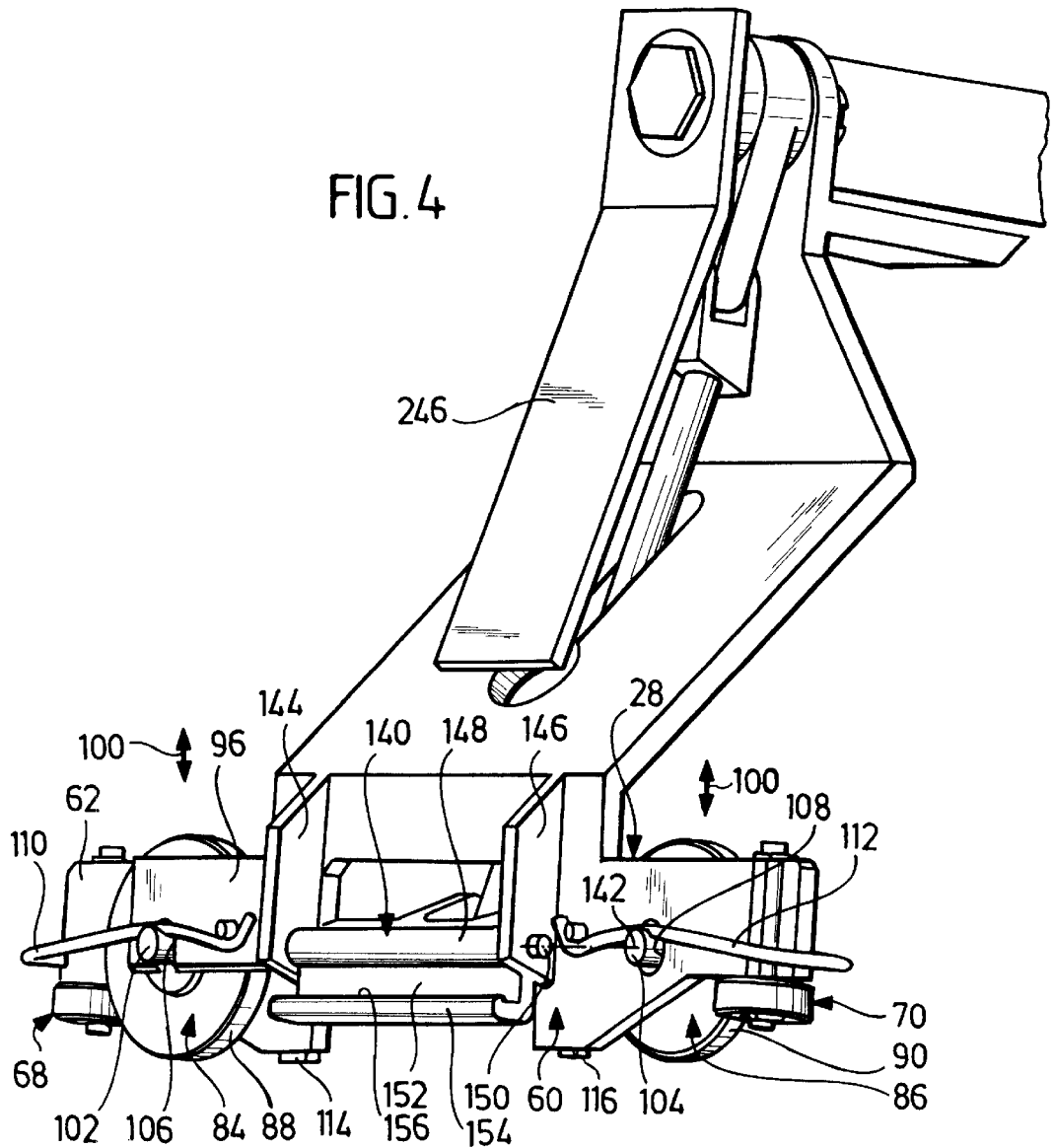
FIG. 4 shows a perspective illustration in the region of the holder with hand-operated element without a receiving rail.

The respective holder foot 28 can be inserted into these receiving rails 32 and is preferably displaceable in the longitudinal direction 54. For this purpose, the respective holder foot 28, as illustrated in FIG. 4, comprises a foot member 60 which has a bearing plate 62 which extends parallel to the longitudinal direction 54 and transversely to the contact surface 36 of the receiving rail 32. The bearing plate 62 thereby bears at its ends 64 and 66, which are arranged at a distance from one another in the longitudinal direction 54, respective transverse guide rollers 69 and 70 which are mounted for rotation about axes 72 and 74, respectively, extending transversely to the contact surface 36, preferably at right angles thereto, and are guided at such a distance above the contact surface 36 that each of the guide rollers 68, 70 is located with its respective casing surface 76, 78 between facing end edges 80 and 82 of the upper transverse arms 42, 44 and thus extends in the opening 46 such that the respective holder foot 28 is guided by the two guide rollers 68 and 70 transversely to the longitudinal direction 54 of the respective receiving rail 32 at the transverse arms 42, 44 so as to be secured against movements transversely to the longitudinal direction 54 and against any canting in the receiving rail 32.

In addition, rollers 84 and 86 are provided near the ends 64 and 66 of the bearing plate 62 and these rollers can be placed on the contact surface 36.

The rollers 84 and 86 are preferably arranged on opposite sides of the bearing plate 62 so that the one roller 84 is arranged between the bearing plate 62 and the one upper transverse arm 42 and the other roller 86 between the bearing plate 62 and the other upper transverse arm 44 and, consequently, the rollers 84 and 86 are movable with their casing surfaces 88 and 90 along paths 92 and 94, respectively, of the contact surface 36 parallel to one another in the longitudinal direction 54, wherein the paths 92 and 94 are spaced from one another transversely to the longitudinal direction 54.

The respective holder foot 28 can be displaced lightly, in particular, with slight frictional resistance in the respective receiving rail 32 with the rollers 84 and 86 arranged on each holder foot 28 as well as the guide rollers 68 and 70 and so an easy positioning of the roof rack is possible due to displacement of the holder feet 28 in the corresponding receiving rail 32 in the direction of travel, i.e., in longitudinal direction 54 of the receiving rail 32, wherein the rollers 84 and 86 provide for a lightly displaceable support of the respective holder foot 28 on the contact surface 36 and the guide rollers 68 and 70 provide for a lightly running, canting-free transverse guidance of the respective holder foot 28 in the receiving rail 32 due to their abutment on the end faces 80 and 82 of the upper transverse arms 42 and 44.

In addition, the rollers 84 and 86 are, as is clearly apparent in FIGS. 3 and 4, each guided between the bearing plate 62 and an additional plate 96 and 98, respectively, of the foot member 60 arranged to face the respective transverse arm 42 or 44 and are thereby vertically adjustable relative to the bearing plate 62 and transversely to the contact surface 36 in a vertical direction 100 in that a respective bearing axle 102, 104 of the rollers 84, 86 is movable in elongated holes 106 and 108, respectively, in the vertical direction 100.

In addition, U-shaped spring clips 110, 112 held on the foot member 60 are provided (FIGS. 3 and 4) and these act on the bearing axles 102 and 104 in such a manner that the rollers 84 and 86 supported on the contact surface 36 guide the bearing plate 62 as high as possible above the contact surface 36 when the rollers 84, 86 are seated on the paths 92, 94 with their casing surfaces 88, 90 and run along them.

Figure 5:
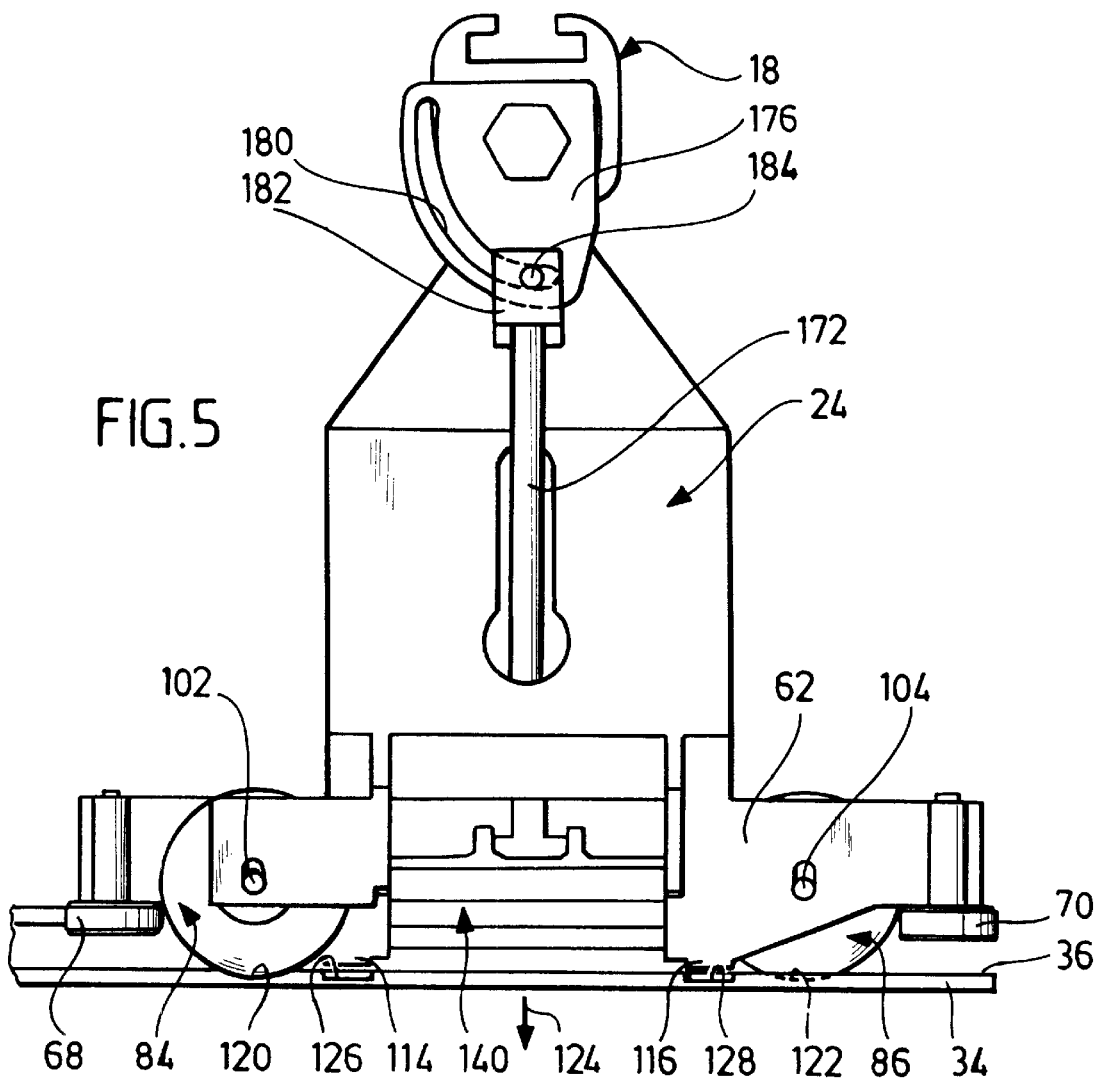
FIG. 5 shows a side view of the holder with hand-operated element with a cutaway receiving rail with a preliminarily positioned holder foot and positive-locking elements of holder foot and receiving rail not engaging in one another.

The bearing plate 62 is, in particular, guided at such a height that, as illustrated in FIG. 5, fixing members 114 and 116, which are provided on the bearing plate 62, are movable above the contact surface 36 without touching it.

In order to indicate to the user during the mounting a defined position of the respective holder foot 28 in the respective receiving means 12, in which the roof rack 16 can preferably be positioned in the receiving rails 32 in relation to the longitudinal direction 54, the paths 92 and 94 are provided with recesses 120, 122 for the rollers 84 and 86 which indicate the preferred position of the roof rack 16 to a user, in particular, in the case of the slight displacement of the respective holder foot 28 in the receiving rail 32 in that when the rollers 84, 86 dip into the recesses 120 and 122 a slight resistance against a continued displacement due to "catching" of the rollers 84, 86 in the recesses 120, 122 can be ascertained.

Even with rollers 84, 86 seated in the recesses 120, 122, the bearing plate 62 is still guided at such a height above the contact surface 36 that the fixing members 114, 116 can still be moved above the contact surface 36 without touching it (FIG. 5).

Figure 6:
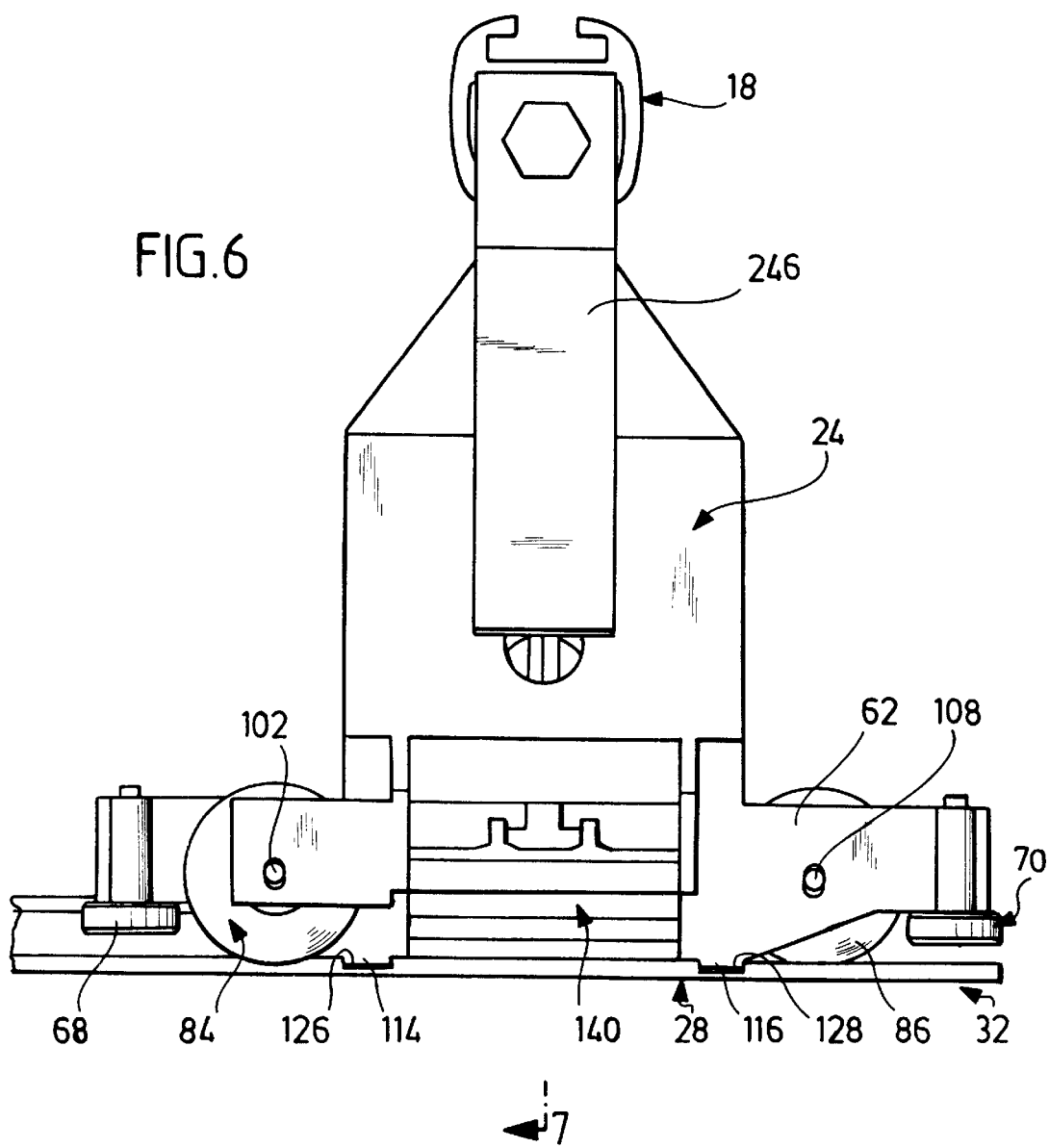
FIG. 6 shows a side view according to FIG. 5 with positive-locking elements of holder foot and receiving rail engaging in one another.

It is only possible due to the bearing plate 62 being acted upon in a fixing direction 124 to displace the bearing plate 62 relative to the bearing axles 102, 104 to such an extent in the direction of the contact arm 34 that the fixing members 114, 116 dip into fixing receiving means 126, 128 in the contact arm 34 associated with them and thus effect a positive-locking securing of the bearing plate 62 relative to the receiving rail 32. The bearing plate 62, and thus the entire holder foot 28, is therefore no longer displaceable relative to the respective receiving rail 32 (FIG. 6).

In this case, when the bearing plate 62 is acted upon in the fixing direction 124 the bearing axles 102, 104 are displaced relative to the bearing plate 62, namely contrary to the force of the spring clips 110 and 112 so that altogether the bearing plate 62 can be lowered in the direction of the contact surface 36.

In order to fix the holder feet 28 in position, each holder foot 28 is provided with a swivel claw which represents a fixing device and is designated as a whole as 140 and which is mounted on the holder foot 28 so as to be pivotable about a pivot axis 142 extending approximately parallel to the longitudinal direction 54. The bearing plate 62 preferably bears for this purpose two bearing lugs 144 and 146, between which the swivel claw 140 is arranged and on which the swivel claw 140 is mounted so as to be pivotable about the pivot axis 142. The swivel claw 140 comprises, for its part, a bearing member 148, on which a swivel shaft 150 penetrating the bearing lugs 144 and 146 is held. A central web 152 of the swivel claw extends from the bearing member 148 and a nose web 154 then extends transversely, i.e. at an angle, to the swivel claw and, for its part, has at its end a nose 156.

Figure 7:
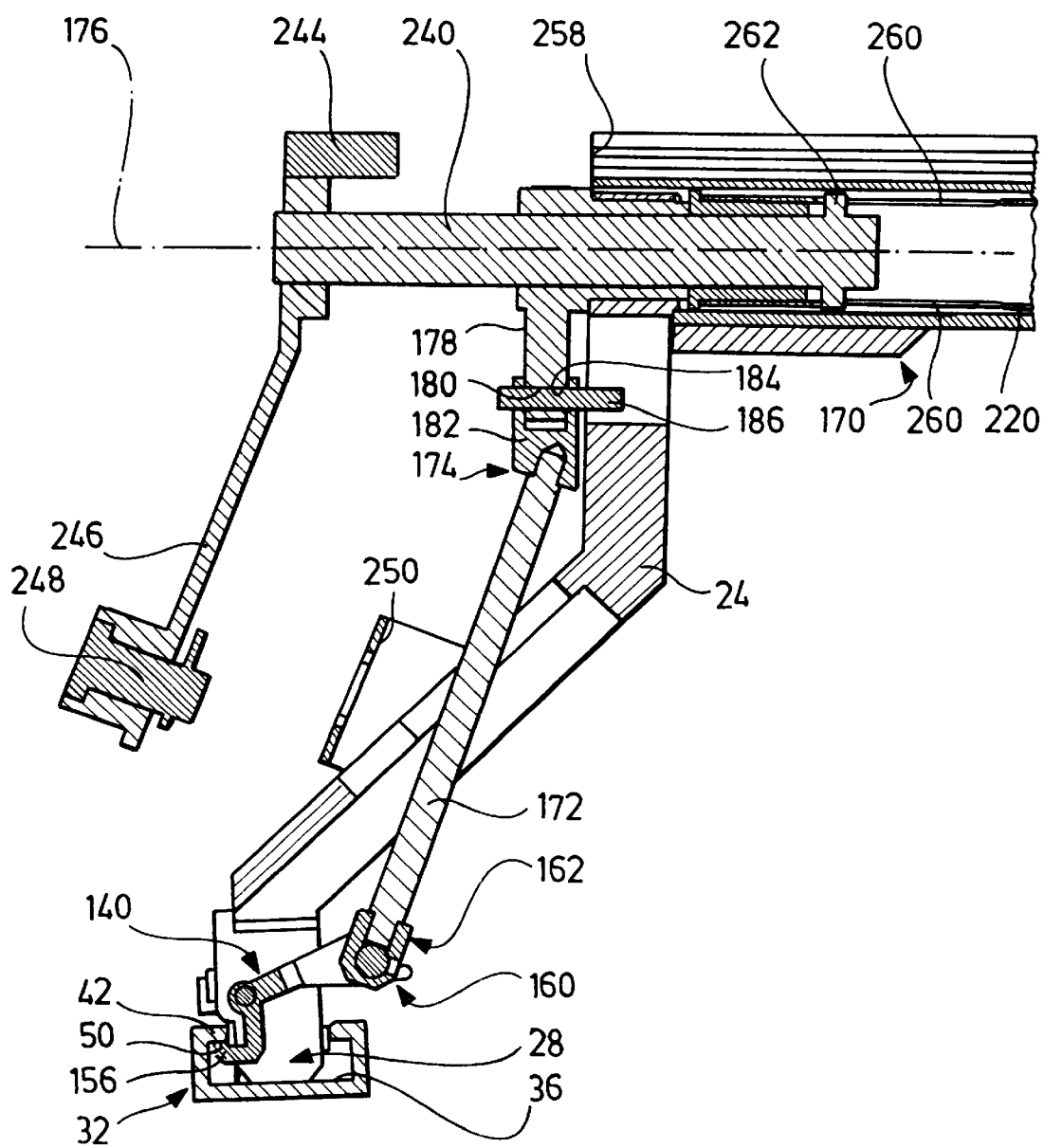
FIG. 7 shows a section along line 7—7 in FIG. 6 with hand-operated element in operable position but a fixing device in fixing position.

The nose web 154 is thereby arranged such that this is in a position to engage under one of the undersides 50, 52 of the upper transverse arms 42, 44 on the side of the inner space 48 laterally of the bearing plate 62, wherein the nose 156 engages, in this case, on the underside 50, as illustrated in FIG. 7. In order to be able to pivot the swivel claw 140 in such a manner, this has a fork-like actuating member 160 which is illustrated, for example, in FIGS. 3 and 7 and in which a rod assembly coupling part 162 is pivotally mounted, wherein this rod assembly coupling part 162 preferably has a bearing pin 164 which is pivotally mounted in receiving means 166, 168 of the fork-like actuating member 160.

The rod assembly coupling part 162 is securely connected to an actuating bar 172 of a coupling device designated as a whole as 170. The actuating bar 172 is pivotable in the direction towards the respective holder foot 28 or away from it due to an actuating gear 174 of the coupling device 170, wherein the actuating gear 174 has a connecting link member 178 which is rotatable about an axis of rotation 176 and has a connecting link path 180 which extends at a distance from the axis of rotation 176, is variable as such and into which a pin 186 held on a head 182 of the actuating bar 172 engages as connecting link follower.

If the connecting link member 178 is in such a position that an area 184 of the connecting link path 180 acting on the bearing pin 186 has the greatest distance from the axis of rotation 176, the actuating bar 172 is displaced to a maximum in the direction of the holder foot 28 and the rod assembly coupling part 162 interacts with the fork-like actuating member 160 such that the swivel claw 140, as illustrated in FIG. 7, is in its fixing position, in which it abuts with the nose 156 on the underside 50 of the upper transverse arm 42. On account of the pivotable mounting of the swivel claw 140 on the bearing plate 62, this is acted upon in the direction of the contact surface 36 and displaced in the direction of the contact surface 36 in that the spring clips 110 and 112 permit movement of the bearing plate 62 relative to the bearing axles 102 and 104 so that the fixing members 114, 116 can dip into the fixing receiving means 126, 128 in a positive-locking manner so that the holder foot 28 is secured directly in position relative to the receiving rail 32.

Figure 8:
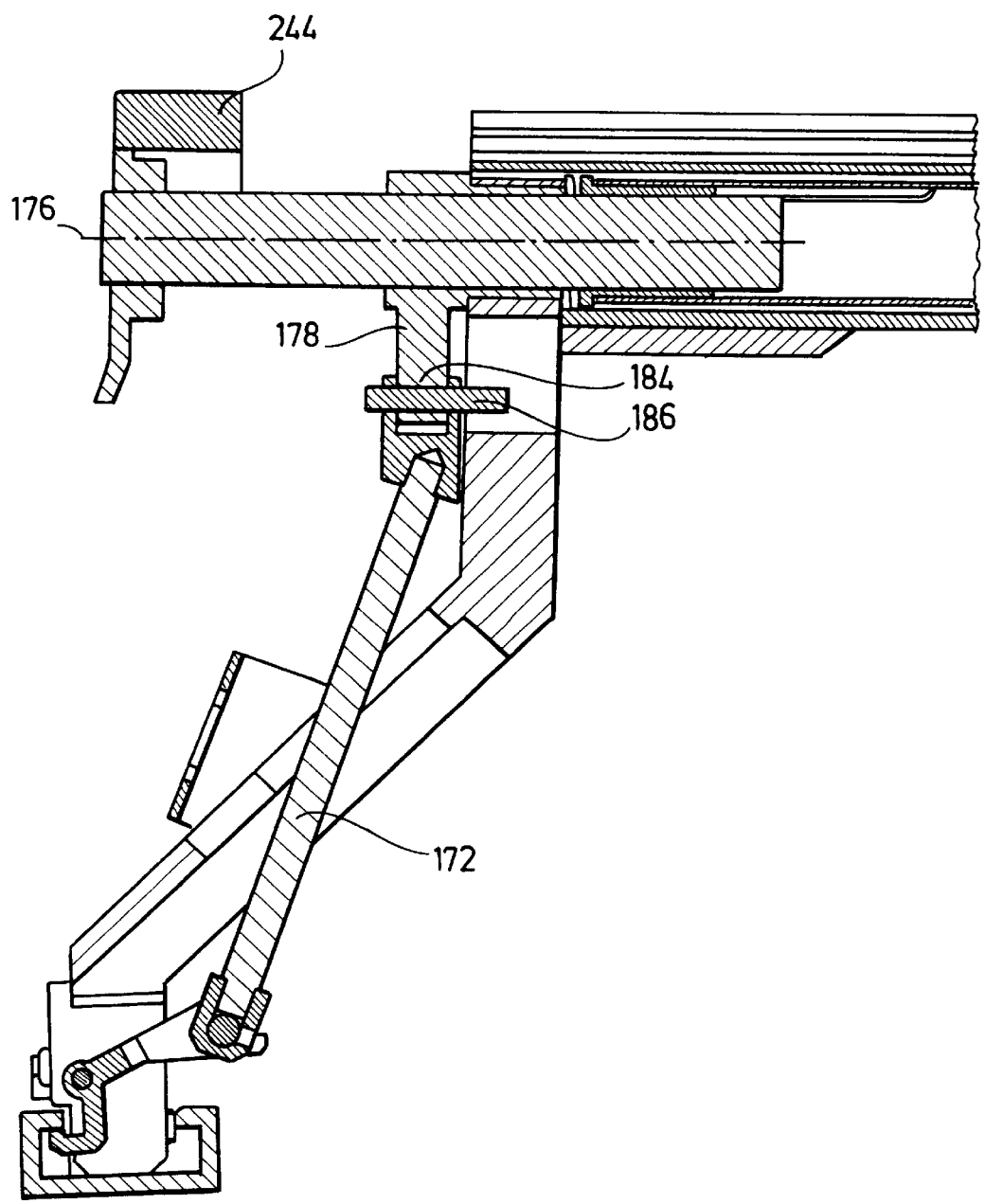
FIG. 8 shows a section similar to FIG. 7 with hand-operated element turned through 30° out of the fixing position in the direction of a release position.

If, on the other hand, the connecting link member 178 is turned about the axis of rotation 176, for example, through 30°, as illustrated in FIG. 8, this rotation merely serves the purpose of leaving the area 184 of the connecting link path 180 slowly so that, first of all, no appreciable movement of the actuating bar 172 takes place in the direction of the connecting link member 178 and thus only a slight movement of the nose 156 takes place away from the underside 50. Due to the slight rotation of the connecting link member 178, only a release of the fixing position of the swivel claw 140 is effected, as illustrated in FIG. 8.

Figure 9:
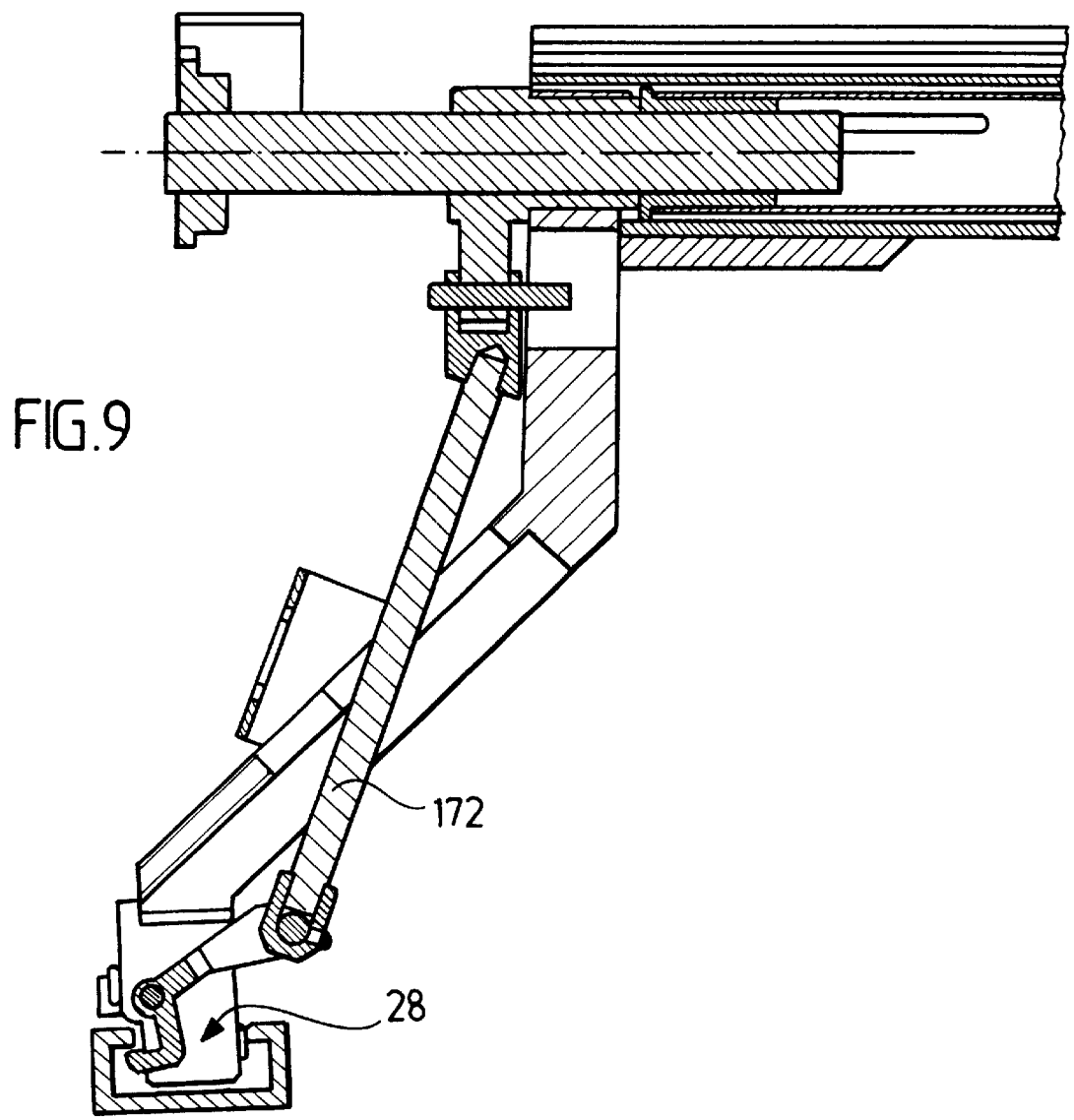
FIG. 9 shows a section similar to FIG. 8 with hand-operated element turned through 60° in relation to the fixing position.

Further rotation of the connecting link member 178 leads to the nose 156 being moved away from the underside 50 of the transverse arm 42 to such an extent that displacement of the roof rack 16 with holder feet 28 guided in the receiving rails 32 is possible without the holder feet 28 being able to lift out of the receiving rails, as illustrated in FIG. 9, since the swivel claws 140 still engage the underside 50 with the noses 156.

Figure 10:
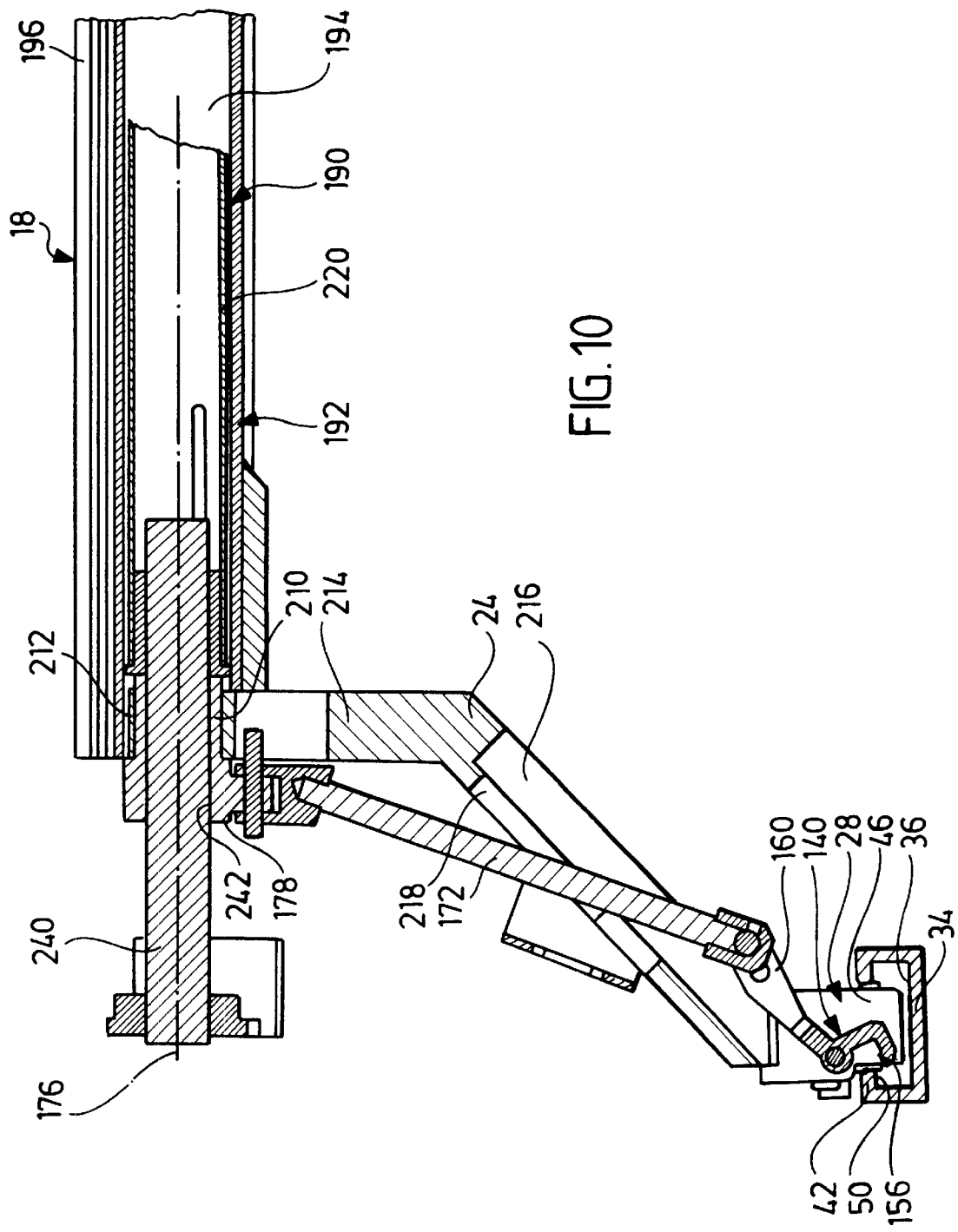
FIG. 10 shows a section similar to FIG. 7 with hand-operated element in release position.

Only a further rotation of the connecting link member 178, illustrated in FIG. 10, causes movement of the actuating bar 172 away from the holder foot 28 and thus pivoting of the swivel claw 140 in such a manner that the nose 156 moves away from the underside 50 of the upper transverse arm 42 to such an extent until the nose 156 is located beneath the opening 46 and thus the holder foot 28, together with the pivoted fixing claw 140, can be moved out of the receiving rail 32 through the opening 46.

In this release position of the fixing claw 140, insertion of the holder foot 28 into the inner space 48 of the receiving rail 32 or removal of the holder foot 28 out of it is possible without the nose 156 hindering this. Only when the nose 156 is pivoted from the release position illustrated in FIG. 10 in the direction of the underside 50 of the transverse arm 42 does the nose 156 engage the underside 50 and prevent removal of the holder foot 28 out of the inner space 48 of the receiving rail 32, wherein the bearing plate 62 of the holder foot is acted upon at the same time in the direction of the contact surface 36 in order to allow the fixing members 114, 116 to dip into the fixing receiving means 126, 128.

Since each of the two holder feet 28 arranged on opposite sides of the cross member 18 is provided with such a swivel claw 140, the respective actuating gears 174 are provided on both sides of the cross member 18. These are coupled to one another by a coupling shaft 190 penetrating the cross member 18 (FIGS. 1, 7 to 12).

For this purpose, the cross member 18 preferably has a tubular member 192 which forms an inner chamber 194 which extends over the entire transverse extension of the cross member 18 and is open at the ends. Furthermore, a groove member 196 with a T-shaped groove 198, which is integrally formed on the tubular member 192, is seated above this and has a groove opening 200 arranged so as to face away from the roof 14 of the motor vehicle, wherein groove blocks can be inserted into the T-shaped groove 198 for fixing loads or load carriers and can preferably be fixed in a positive-locking manner.

The coupling shaft 190 is located in the inner chamber 194 and is mounted for rotation about the axis of rotation 176 so that the rotatable mounting of the coupling shaft 190 represents at the same time a rotatable mounting for the connecting link member 178.

A sleeve 210 is preferably formed on each connecting link member 178 and this is mounted in a sleeve receiving means 212 for rotation about the axis of rotation 176, wherein the sleeve receiving means 212 is arranged in the respective holder 24, 26, namely in an area thereof adjoining the tubular member 192, wherein the respective holder 24, 26 is itself securely connected to the tubular member 192 (FIGS. 7 to 12).

Each of the holders 24, 26 is preferably designed such that it has a first section 214, which bears the sleeve receiving means 212 and extends approximately transversely to the cross member 18, then a second section 216, which extends to the respective holder foot 28, proceeding from the first section 214, at a respective angle outwards in the direction towards a side located opposite the cross member and is securely connected to this foot. The second section 216 is also provided with an opening 218, through which the actuating bar 172 extends in order to extend from the connecting link member 178 to the fork-like actuating member 160 which is arranged on an inner side of the respective holder foot 28 facing the other holder foot 28 whereas the respective connecting link member 178 is arranged on an outer side of the respective first section 214 facing away from the first section 214 located respectively opposite.

The mounting of the coupling shaft 190 takes place via the sleeves 210 of the connecting link members 178 respectively mounted for rotation in the sleeve receiving means 212 of the holders 24, 26.

Figure 11:
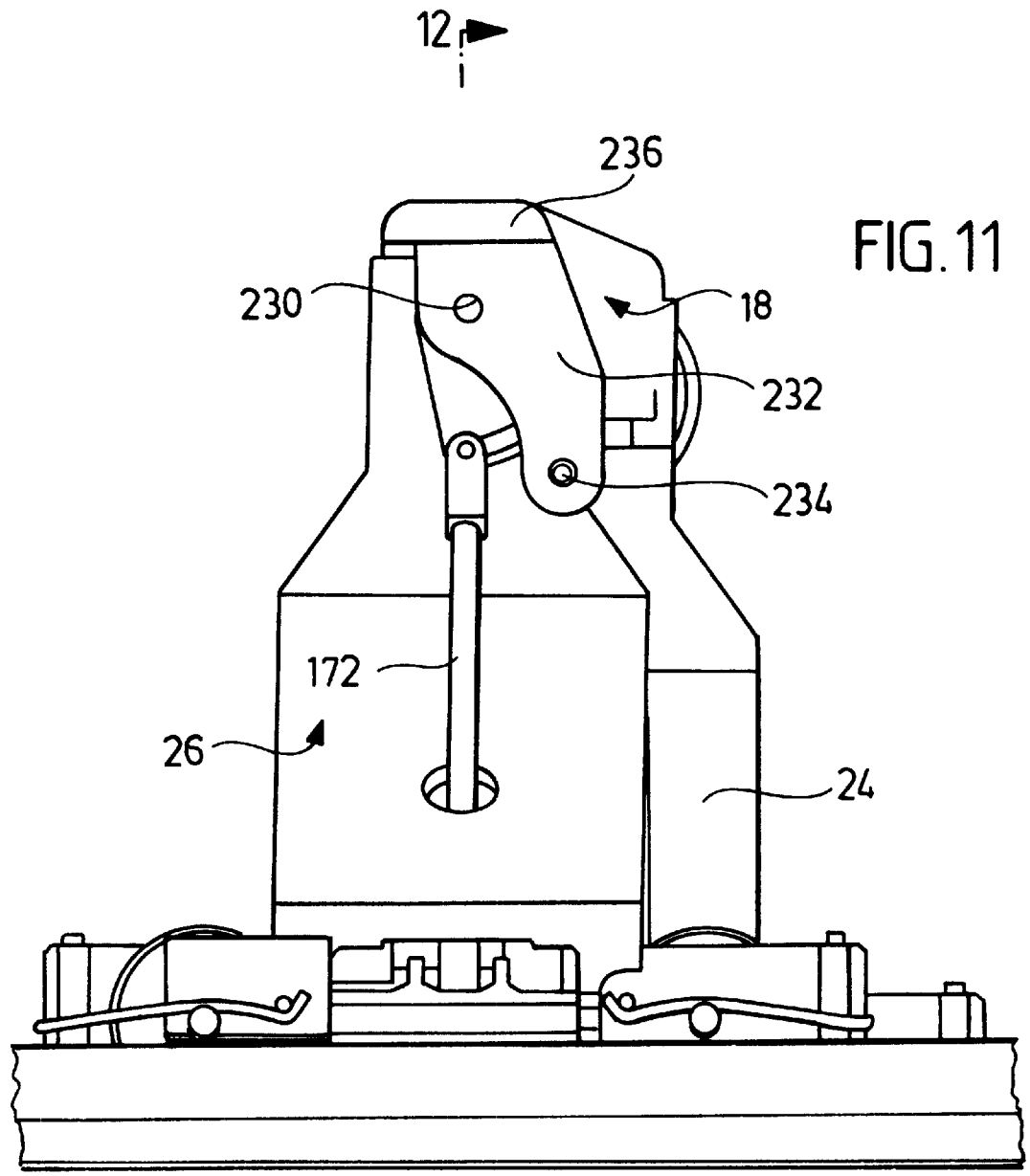
FIG. 11 shows a side view of the holder without hand-operated element.
Figure 12:
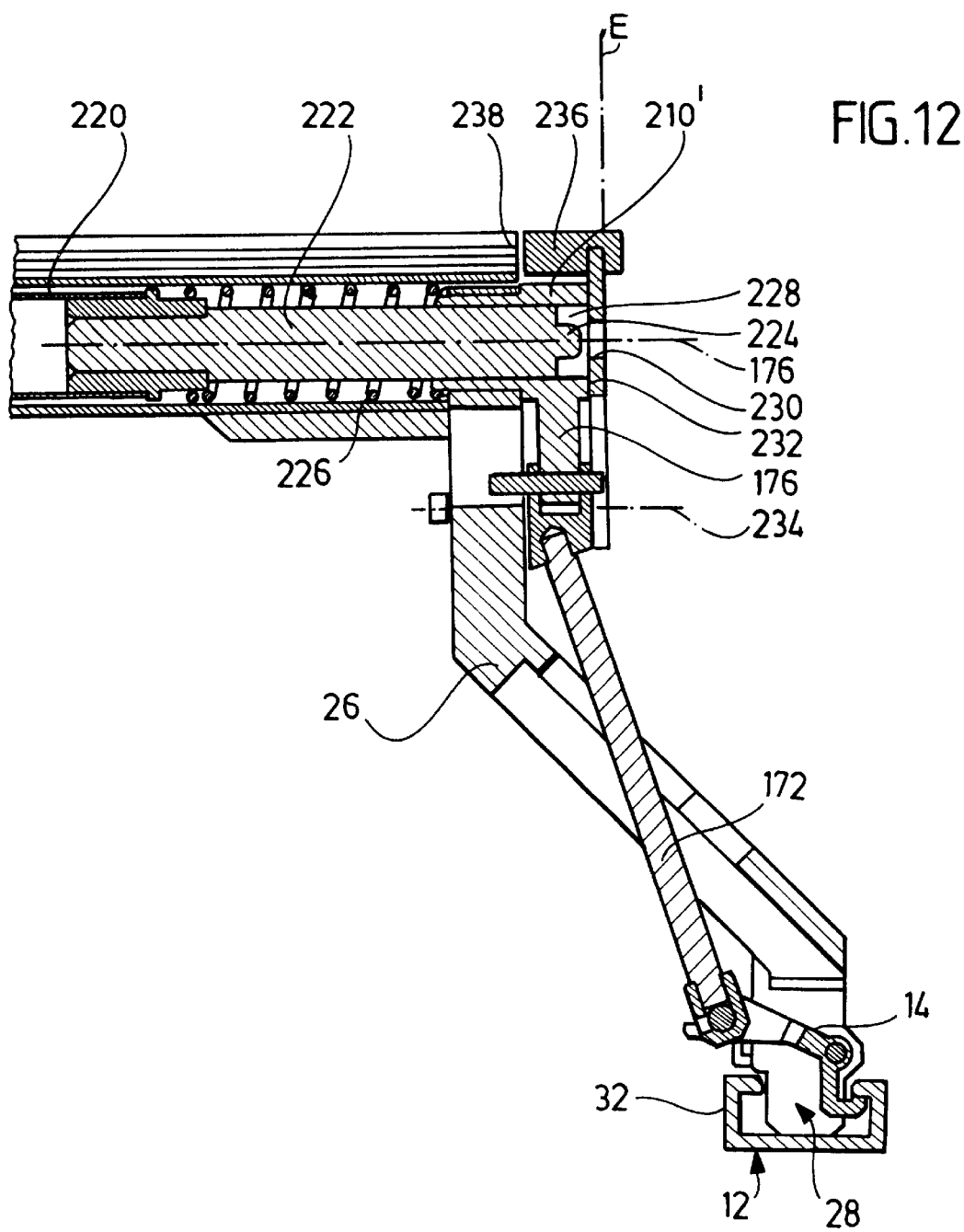
FIG. 12 shows a section along line 12—12 in FIG. 11.

The coupling shaft 190 comprises a central section 220 which is preferably designed as a tube and has on one side a polygonal pin 222 which is securely connected to this tube 220, is non-rotatably accommodated in the sleeve 210' of the holder 26 and bears an adjusting pin 224 at one end face facing away from the tube 220 (FIGS. 11, 12). Furthermore, the polygonal pin 222 is acted upon by means of a spring 226, which is preferably supported on the sleeve 210', such that the adjusting pin 224 endeavors to dip into an opening 228 provided for acommodating the polygonal pin 222 in the sleeve 210'. Only when the tube 220 is acted upon in the direction of the sleeve 210' does the adjusting pin 224 move out of the opening and pass into an adjusting recess 230 which is provided in a swivel bracket 232 which is mounted on the holder 26 to as to be pivotable about an axis 234. The swivel bracket 232 thereby bears at an upper end a closure member 236 which is movable in front of an end opening 238 of the T-shaped groove 198 in order to close this. The closure member is pivotable as a result of pivoting of the swivel bracket 232 about the axis 234 from its closure position located in front of the opening 238 into a position next to the opening 238 and releasing it. In the closure position, the adjusting recess 230 is, however, aligned with the adjusting pin 224 so that when the adjusting pin 224 engages in the adjusting recess 230 a pivoting of the swivel bracket 232 about the axis 234 is no longer possible and the closure member 236 is secured in its closure position.

On its side located opposite the polygonal pin 222 the tube 220 is likewise connected to a polygonal pin 240 (FIG. 7) but the polygonal pin 240 is displaceable relative to the tube 220 in the direction of the axis of rotation 176. The polygonal pin 240 likewise passes through an opening 242 in the sleeve 210 and bears on its outer side projecting beyond the connecting link member 178 a closure member 244 and, moreover, a hand-operated element 246 illustrated in FIG. 7. This hand-operated element 246 is movable from an operable position illustrated in FIG. 7, in which it is spaced from the holder 24 and in which the polygonal pin 240 is withdrawn to its maximum out of the tube 220, into a non-operable position, in which it can be secured and locked on the holder 24 with a lock 248, preferably on a lock receiving means 250 which is arranged on the holder 24. In order to transfer the hand-operated element 246 from its non-operable position secured on the holder 24 and unreleasably secured by the lock 248 into an operable position, the polygonal pin 240 is displaced exclusively in the direction of the axis of rotation 176 in such a manner that the closure member 244 is removed from an end-face opening 258 of the T-shaped groove 198 on this side. If this displacement of the closure member 244 in relation to the opening 258 is far enough, groove blocks may be introduced into the T-shaped groove 198 in the customary manner to fix loads or load carriers in position.

At the same time, the possibility is created in the operable position of the hand-operated element 246 of gripping and turning this easily without colliding with the holder 24, wherein a rotation of the two connecting link members 178, which are coupled by the coupling shaft 190, is therefore possible and thus an actuation of the swivel claws 140 in the area of the two holder feet 28. For the connection of the polygonal pin 240 to the tube 220, which is, on the one hand, non-rotatable and, on the other hand, displaceable in the direction of the axis of rotation 176, the tube 220 is provided with at least one, preferably two elongated holes 260 which are arranged on opposite sides and into which entraining members 262 dip which project transversely to the axis of rotation 176 beyond the polygonal pin 240 and which are displaceable in the elongated holes 260 in the direction of the axis of rotation 176 but are not movable in circumferential direction to the axis of rotation 176 relative to the elongated holes 260. It is thus possible to freely displace the polygonal pin 240 over the length of the elongated holes 260 relative to the tube 220. The elongated holes 260 are thereby dimensioned such that during insertion of the polygonal pin 240 into the tube 220 the entraining members 262 already abut on the inner end of the elongated holes 260 facing the polygonal pin 222 before the closure member 244 is seated directly in front of the opening 258. A further displacement of the polygonal pin 240 in the direction of the tube 220 results in a displacement of the entire tube 220 in the direction of the holder 26 so that in the non-operable position of the hand-operated element 246, in which this can be secured on the holder 24 by the lock 248, the tube 220 acts contrary to the force of the spring 226 and displaces the polygonal pin 222 to such an extent until the adjusting pin 224 engages in the adjusting recess 230 and also secures the swivel bracket 232 and thus the closure member 236 relative to the opening 238 of the T-shaped groove.

Therefore, in the non-operable position of the hand-operated element 246 the closure member 244 is positioned and secured directly in front of the opening 258 of the T-shaped groove 198 and the closure member 236 is secured in its position directly in front of the opening 238 of the T-shaped groove 198. Only when the hand-operated element 246 is released from the holder 24 as a result of opening the lock 248 will the tube 220 have the possibility of moving in the direction of the sleeve 210 to such an extent that the adjusting pin 224 can dip into the opening 228 and release the swivel bracket 232 by leaving the adjusting recess 230. The swivel bracket 232 is therefore pivotable in front of the opening with the closure member 236 arranged thereon in a plane E at right angles to the axis of rotation 176 and can thus be moved away from the opening 238 of the T-shaped groove 198.

Furthermore, the closure member 244 moves away from the opening 258 of the T-shaped groove 198 located opposite the opening 238 in that it moves exclusively in the direction of the axis of rotation 176 during the transfer of the hand-operated lever 246 from the non-operable position into the operable position.

What is claimed is:

1. Roof load carrier system for motor vehicles, comprising:
   a roof rack with a cross member receiving loads;
   holders arranged on both sides of the cross member;
   holder feet with fixing devices arranged thereon, said holder feet being adapted to be inserted into receiving means arranged on a vehicle and fixed in position in said receiving means with the fixing device;
   a hand-operated element arranged on one side of the roof rack;
   a coupling device for coupling the hand-operated element with the fixing devices such that the fixing devices on both holder feet are actuatable via the hand-operated element said holder feet being provided with rollers which are supported on a contact surface of said receiving means and displaceable in said receiving means;
   a resilient element acting between said rollers and said respective holder foot and being adapted to provide support of said respective holder foot on said rollers if said fixing devices are in a non-fixing position and to allow movement of said respective holder foot towards said receiving means, and for support of said respective holder foot on said receiving means if said fixing devices are in a fixing position.

2. Roof load,carrier system as defined in claim 1, wherein each fixing device has a fixing element adapted to be brought into engagement with an abutment provided on the receiving means as a result of movement along a path extending to the abutment.

3. Roof load carrier system as defined in claim 1, wherein:
   the receiving means is designed as a receiving rail C-shaped in cross section, extending in longitudinal direction of the vehicle and having a contact section, a side section and an upper transverse section;
   the holder foot is placeable on the contact section; and
   the upper transverse section forms an abutment for the fixing device.

4. Roof load carrier system as defined in claim 1, wherein the hand-operated element is designed as a lever.

5. Roof load carrier system as defined in claim 1, wherein in a fixing position of the fixing devices the hand-operated element is adapted to be secured in relation to the holder arranged close to the hand-operated element.

6. Roof load carrier system as defined in claim 5, wherein the hand-operated element is adapted to be fixed with a lock in relation to the holder.

7. Roof load carrier system as defined in claim 5, wherein the hand-operated element is movable between a non-operable position where it is adapted to be fixed on the holder and an operable position where it is adapted not to be fixed on the holder.

8. Roof load carrier system as defined in claim 7, wherein the hand-operated element is movable in the direction of its axis of rotation for the movement from the non-operable position into the operable position.

9. Roof load carrier system for motor vehicles, comprising:
   a roof rack with a cross member receiving loads;
   holders arranged on both sides of the cross member;
   holder feet with fixing devices arranged thereon, said holder feet being adapted to be inserted into receiving means arranged on a vehicle and fixed in position in said receiving means with the fixing devices;
   a hand-operated element arranged on one side of the roof rack;
   a coupling device for coupling the hand-operated element with the fixing devices such that the fixing devices on both holder feet are actuatable via the hand-operated element, each fixing device having a fixing element adapted to be brought into engagement with an abutment provided on the receiving means as a result of movement along a curved path extending to the abutment.

10. Roof load carrier system as defined in claim 9, wherein the fixing element is pivotable about an axis.

11. Roof load carrier system as defined in claim 9, wherein the fixing element has a nose and is movable such that the nose is movable between a release position not engaging the abutment and a fixing position engaging the abutment.

12. Roof load carrier system as defined in claim 9, wherein the receiving means extend in the direction of travel and the holder feet are displaceable in the receiving means in the direction of travel.

13. Roof load carrier system as defined in claim 12, wherein the holder feet are supported in the receiving means with rollers.

14. Roof load carrier system as defined in claim 12, wherein the holder feet are guided in the receiving means with transverse guide rollers.

15. Roof load carrier system as defined in claim 12, wherein the respective holder foot is adapted to be fixed in a positive-locking manner in the respective receiving means against any displacement in longitudinal direction of the receiving means.

16. Roof load carrier system as defined in claim 15, wherein the holder foot and the receiving means have positive-locking elements, said elements being adapted to be brought into engagement as a result of transfer of the fixing device into the fixing position.

17. Roof load carrier system as defined in claim 16, wherein the positive-locking elements are acted upon in a resilient manner in the direction of their non-engaged position.

18. Roof load carrier system as defined in claim 17, wherein during transfer of the fixing device from the release position into the fixing position the fixing device counteracts the spring action on the positive-locking elements.

19. Roof load carrier system as defined in claim 16, wherein:
   the positive-locking element arranged on the holder foot is rigidly connected to the holder foot; and
   the holder foot is acted upon in relation to the receiving means by an element acted upon in a resilient manner, said element abutting on the receiving means and being displaceable therein, such that the positive-locking element arranged on the holder foot and the positive-locking element arranged on the receiving means are disengaged.

20. Roof load carrier system as defined in claim 19, wherein the positive-locking elements are adapted to be brought into engagement as a result of the holder foot being acted upon in support direction towards a contact surface of the receiving means.

21. Roof load carrier system as defined in claim 15, wherein the respective holder foot is preliminarily positionable in the corresponding receiving means prior to engagement of the positive-locking elements in one another.

22. Roof load carrier system as defined in claim 21, wherein the elements displaceable in the receiving means are preliminarily positionable in the receiving means in a defined position as a result of a slight locking.

23. Roof load carrier system as defined in claim 22, wherein the receiving means is provided with recesses, the elements engaging in said recesses for the preliminary positioning of the respective holder foot relative to the receiving means.

24. Roof load carrier system for motor vehicles, comprising:
   a roof rack with a cross member receiving loads;
   holders arranged on both sides of the cross member;
   holder feet with fixing devices arranged thereon, said holder feet being adapted to be inserted into receiving means arranged on a vehicle and fixed in position in said receiving means with the fixing devices;
   a hand-operated element arranged on one side of the roof rack;
   a coupling device for coupling the hand-operated element with the fixing devices such that the fixing devices on both holder feet are actuatable via the hand-operated element, the fixing device being designed as a swivel claw.

25. Roof load carrier system for motor vehicles, comprising:
   a roof rack with a cross member receiving loads;
   holders arranged on both sides of the cross member;
   holder feet with fixing devices arranged thereon, said holder feet being adapted to be inserted into receiving means arranged on a vehicle and fixed in position in said receiving means with the fixing devices;
   a hand-operated element arranged on one side of the roof rack;
   a coupling device for coupling the hand-operated element with the fixing devices such that the fixing devices on both holder feet are actuatable via the hand-operated element, the receiving means being designed as a receiving rail C-shaped in cross section, extending in longitudinal direction of the vehicle and having a contact section, two side sections and two upper transverse sections, and forming a T-shaped groove, the respective holder foot being insertable into said groove and placeable on the contact section and said upper transverse section forming an abutment for said fixing device.

26. Roof load carrier system as defined in claim 25, wherein with a fixing element in release position the respective holder foot is insertable into the T-shaped groove by way of an opening therein extending between the transverse sections over the length thereof and that the fixing element is adapted to be brought into the fixing position when a holder foot is inserted into the T-shaped groove.

27. Roof load carrier system for motor vehicles, comprising:
   a roof rack with a cross member receiving loads;
   holders arranged on both sides of the cross member;
   holder feet with fixing devices arranged thereon, said holder feet being adapted to be inserted into receiving means arranged on a vehicle and fixed in position in said receiving means with the fixing devices;
   a hand-operated element arranged on one side of the roof rack;
   a coupling device for coupling the hand-operated element with the fixing devices such that the fixing devices on both holder feet are actuatable via the hand-operated element, said coupling device being designed as a coupling rod assembly acting on the fixing device in the direction not only of the release position but also of the fixing position.

28. Roof load carrier system as defined in claim 27, wherein the coupling rod assembly has a coupling shaft extending along the cross member and drive elements for the fixing devices arranged on both sides of said shaft.

29. Roof load carrier system as defined in claim 28, wherein the drive elements act on the fixing devices via connecting rod assemblies.

30. Roof load carrier system as defined in claim 29, wherein the drive elements comprise gear elements for the actuation of the connecting rod assemblies.

31. Roof load carrier system as defined in claim 30, wherein the gear elements are designed as connecting link gears.

32. Roof load carrier system as defined in claim 28, wherein the hand-operated element is arranged on at least one side of the coupling shaft.

33. Roof load carrier system for motor vehicles, comprising:
   a roof rack with a cross member receiving loads, said cross member being provided with a transverse guide groove;

holders arranged on both sides of the cross member;

holder feet with fixing devices arranged thereon, said holder feet being adapted to be inserted into receiving means arranged on a vehicle and fixed in position in said receiving means with the fixing devices;

a hand-operated element arranged on one side of the roof rack;

a coupling device for coupling the hand-operated element with the fixing devices such that the fixing devices on both holder feet are actuatable via the hand-operated element.

34. Roof load carrier system as defined in claim 33, wherein the transverse guide groove has outer insertion openings for groove blocks.

35. Roof load carrier system as defined in claim 34, wherein the outer insertion openings are closable by closure elements.

36. Roof load carrier system as defined in claim 35, wherein the closure elements are secured in their position closing the outer insertion openings when the hand-operated element is in the fixing position of the fixing devices and is secured on the holder.

37. Roof load carrier system as defined in claim 36, wherein the closure elements are securable by means of the coupling device.

38. Roof load carrier system as defined in claim 36, wherein the closure element arranged on the side of the hand-operated element is securely connected to the hand-operated element and in the non-operable position of the hand-operated element is in a position closing the corresponding insertion opening and in the operable position of the hand-operated element is in a position releasing the insertion opening.

39. Roof load carrier system as defined in claim 36, wherein for securing the closure element on a side of the cross member located opposite the hand-operated element this closure element is held on the holder so as to be pivotable by means of a swivel bracket and is pivotable from a position closing the corresponding outer insertion opening into a position releasing the insertion opening.

40. Roof load carrier system as defined in claim 38, wherein the swivel bracket is securable due to movement of the hand-operated element from the operable position into the non-operable position.

41. Roof load carrier system as defined in claim 40, wherein the coupling shaft has at its end an adjusting element for securing the swivel bracket in the position where the closure element closes the outer insertion opening.

42. Roof load carrier system for motor vehicles, comprising:

a roof rack with a cross member receiving loads, said roof rack having a receiving element with insertion openings for load fixing elements to be inserted into said receiving elements, said insertion openings being provided with closure elements for closing said insertion openings;

holders arranged on both sides of the cross member;

holder feet with fixing devices arranged thereon, said holder feet being adapted to be inserted into receiving means arranged on a vehicle and fixed in position in said receiving means with the fixing devices;

a hand-operated element arranged on one side of the roof rack;

a coupling device for coupling the hand-operated element with the fixing devices such that the fixing devices on both holder feet are actuatable via the hand-operated element, said closure elements being coupled to said hand operated element so as to enable closure of said insertion openings by operating said hand-operated element.

* * * * *